United States Patent

[11] 3,604,945

[72] Inventors Eric J. Hoffman
Baltimore;
Reginald M. Rhue, Laurel, both of, Md.

[21] Appl. No. 773,572
[22] Filed Nov. 5, 1968
[45] Patented Sept. 14, 1971
[73] Assignee The United States of America as represented by the Secretary of the Navy

[54] REGENERATIVE TONE DECODER
6 Claims, 3 Drawing Figs.

[52] U.S. Cl. .......... 307/233, 306/210, 307/252 J, 307/290, 330/30 D
[51] Int. Cl. .......... H03k 3/26
[50] Field of Search .......... 307/233, 210, 228, 252, 290; 328/92, 140; 325/320; 340/171; 330/30 D; 317/290

[56] References Cited
UNITED STATES PATENTS

| | | | |
|---|---|---|---|
| 3,308,307 | 3/1967 | Moritz | 307/290 |
| 3,366,961 | 1/1968 | Goldstein | 340/171 |
| 3,432,688 | 3/1969 | Zola | 330/30 |
| 3,471,846 | 10/1969 | Cotter | 340/171 |
| 3,497,722 | 2/1970 | Fairweather | 307/252 |

*Primary Examiner*—Donald D. Forrer
*Assistant Examiner*—David M. Carter
*Attorneys*—R. S. Sciascia and J. A. Cooke

ABSTRACT: For a spacecraft command system, a tone decoder which distinguishes between binary zeros and ones. The circuit combines the operations of a differential amplifier, a threshold detector, a Schmitt trigger and a fast-reset integrator in a single circuit which uses fewer components than would be required if these operations were cascaded, as in the prior art.

INVENTORS
ERIC J. HOFFMAN
REGINALD M. RHUE

BY J. O. Tresansky
ATTORNEY

INVENTORS
ERIC J. HOFFMAN
REGINALD M. RHUE

INVENTORS
ERIC J. HOFFMAN
REGINALD M. RHUE

REGENERATIVE TONE DECODER

BRIEF DESCRIPTION OF THE INVENTION

The present invention relates to a tone decoder for a high reliability spacecraft command system.

The principal object of the invention is to provide a tone decoder which combines the functions of a differential amplifier, a threshold detector, a Schmitt trigger and a fast-reset integrator in a single circuit using less than half the components that would be required if the above functions were cascaded in the normal manner.

The above object, as well as other objects, features and advantages of the invention will be more readily understood after a reading of the following description.

The decoder of the invention is designed to accept a command signal consisting of tone bursts, each burst being at one of two frequencies representing a binary "1" or "0." Following each burst is a brief interval during which neither tone is present. In more detail, the command signal, which has been amplitude modulated onto a RF carrier, is demodulated by a command receiver and appears at its video output. The video signal is sent to the tone decoder, which test the tone for authenticity sent to examining their timing and frequencies. if the tones are acceptable, the decoder converts them into digital levels and sends said levels, together with properly timed clocking pulses, to logic circuitry. The logic circuitry accumulates the decoded levels in a shift register, and if the satellite address bits are proper, it activates the correct row and column of a relay switching matrix to switch a desired relay or relay cluster to effect the proper command. Commands are generated at the ground station by a special encoder which automatically encodes the satellite address and relay number.

DETAILED DESCRIPTION OF THE INVENTION

Figure 1:
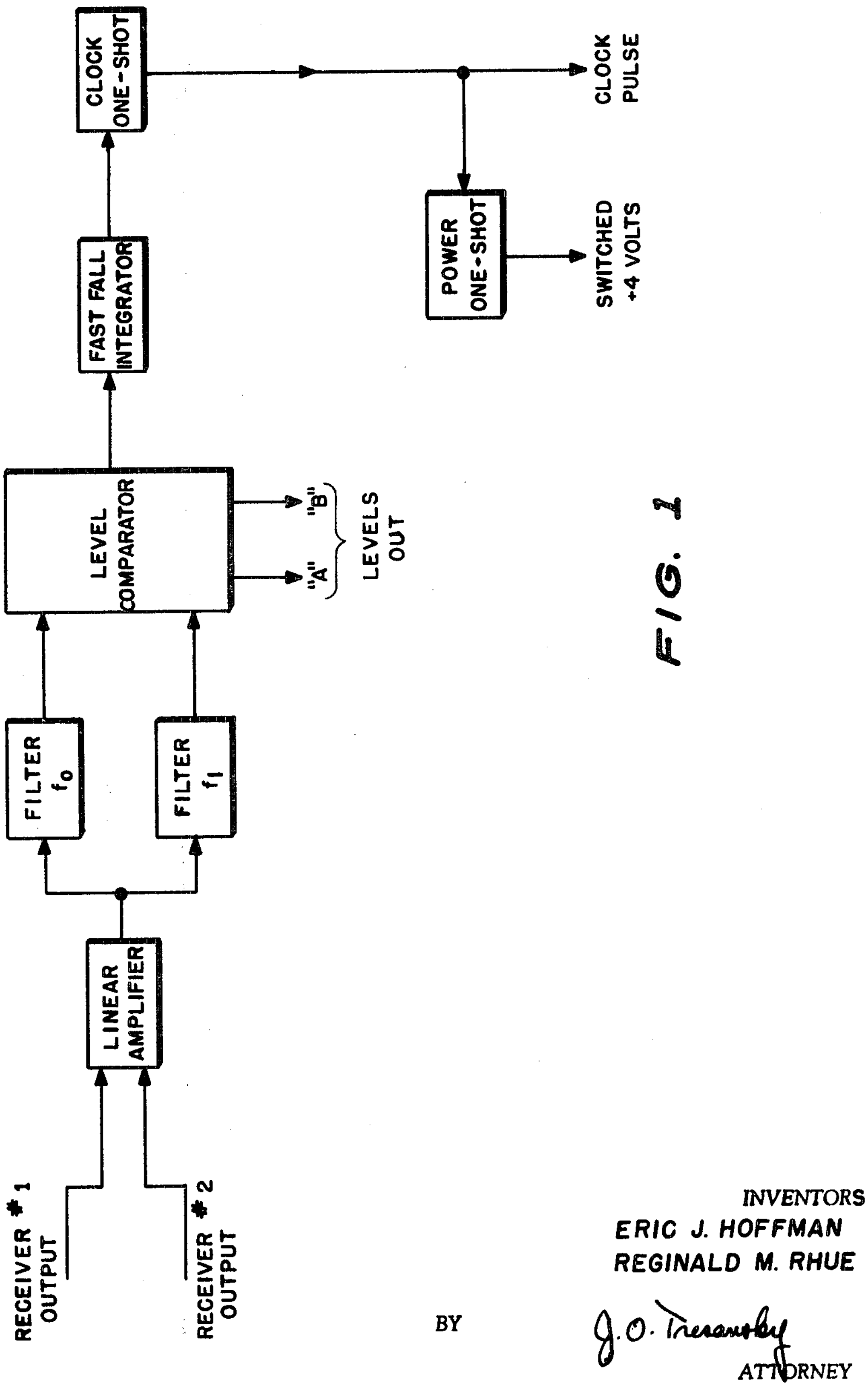
FIG. 1 is a block diagram of a command decoder which includes the tone decoder of the present invention.

The functional block diagram of FIG. 1 shows the command decoder which processes video output from the receivers of a redundant command system into standard digital signals for use by logic circuitry. In additional and among other functions, the decoder performs elementary timing and frequency tests for signal authenticity and controls power to standby sections of the command system. It should be understood that although the decoder of the present invention is adapted for use with a redundant command system to insure reliability of operation in a spacecraft, it is not limited to such use.

In FIG. 1 the video outputs from the receivers of the redundant command system are summed in a unity gain linear amplifier which is capable of driving the two band-pass filters, $f_o$ and $f_1$centered one at each binary tone frequency. The filter outputs are full-wave detected and compared in a differential level comparator which provides high and low levels at its "A" and "B" outputs to indicate which filter has the greatest output. These levels are applied to the shift register stage in the logic circuitry (not shown). When the beginning of a tone burst is sensed, the fast-fall integrator generates a ramp, which drops quickly to the starting voltage when the tone ends. If the tone has been present sufficiently long, the ramp termination fires the clock one-shot which in turn fires the power one-shot. The "A" and "B" outputs are loaded into the first stage of the shift register (not shown) by the clock pulse. Simultaneously the power one-shot applies a positive voltage to the standby sections of the logic circuitry long enough to enable the remaining bits to be loaded into the shift register. Subsequently, each tone burst of proper minimum duration produces the required levels and clock pulse and loads itself into the shift register. Once the power one-shot has been fired, additional clock pulses at its input will not affect it until it turns off. If the power one-shot is not enabled, it does not turn on and no command results.

Extremely short tone bursts, such as those resulting from interference, will not produce a clock pulse when the burst ends. Protection against extremely long bursts or continuous tones is provided by the limited ON-time of the power one-shot.

The normal receiver output with no signal present consists of random noise having about 15 kHz. bandwidth. When a satellite containing the command system is commanded, the video output from the receivers produced essentially the signal shown a the input terminal in FIG. 2 plus whatever noise results from the carrier power used and the path loss encountered. Should one of the receivers fail, it can fail "safe" producing no video output, or "unsafe" in which it produces full noise output. The redundant command system works in either case by summing the two video outputs.

Figure 2:
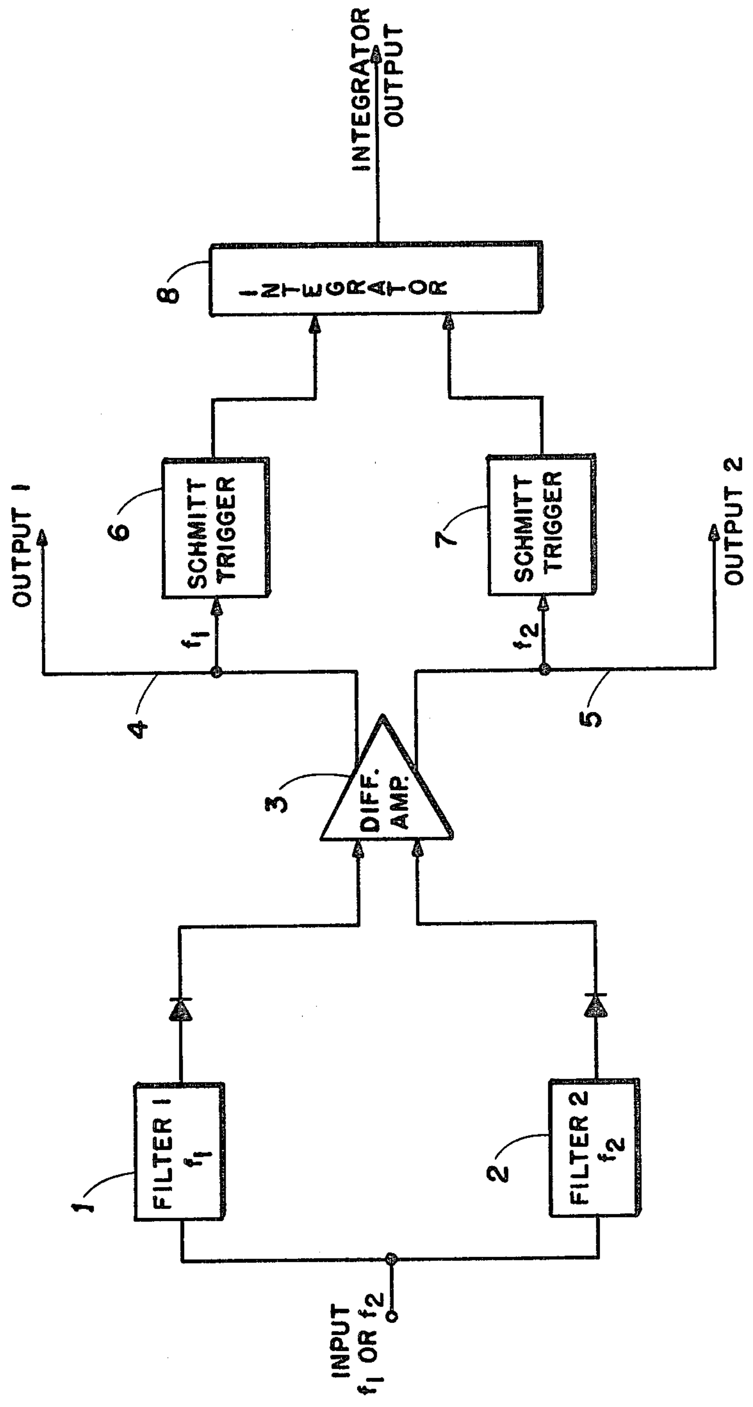
FIG. 2 is a block diagram showing a tone decoder of well-known arrangement.

Referring to FIG. 2, there is shown a block diagram of a conventional tone decoder wherein a pulse of frequency $f_1$ represents a zero, and a pulse of frequency $f_2$ represents a one. An incoming pulse is fed to filters 1 and 2, only one filter being capable of passing the pulse due to the frequency selective nature of the filters. The signal emergent from filter 1 or filter 2 is fed to differential amplifier 3 which is provided with a first pair of outputs 4 and 5 for indicating the presence of a binary zero or a binary one, respectively. The differential amplifier 3 if further provided with a second pair of outputs for feeding Schmitt triggers 6 and 7, which, in turn, feed integrator 8. The Schmitt triggers serve to distinguish between input pulses and noise, and also serve to square off input pulses. The function of the integrator is to measure the duration of input pulses, integration being necessary because input pulses which indicate binary digits lie within a certain range of duration.

In the conventional tone decoder, shown in FIG. 2, there is much repetition of circuitry, since the components represented by blocks are entire, operable, units The decoder of the present invention suffers the "disadvantage" of not being separable into integral units since certain of its components serve more than one function; but this "disadvantage" could be viewed as an advantage since there is a great component reduction resulting from the use of multifunctional components.

Figure 3:
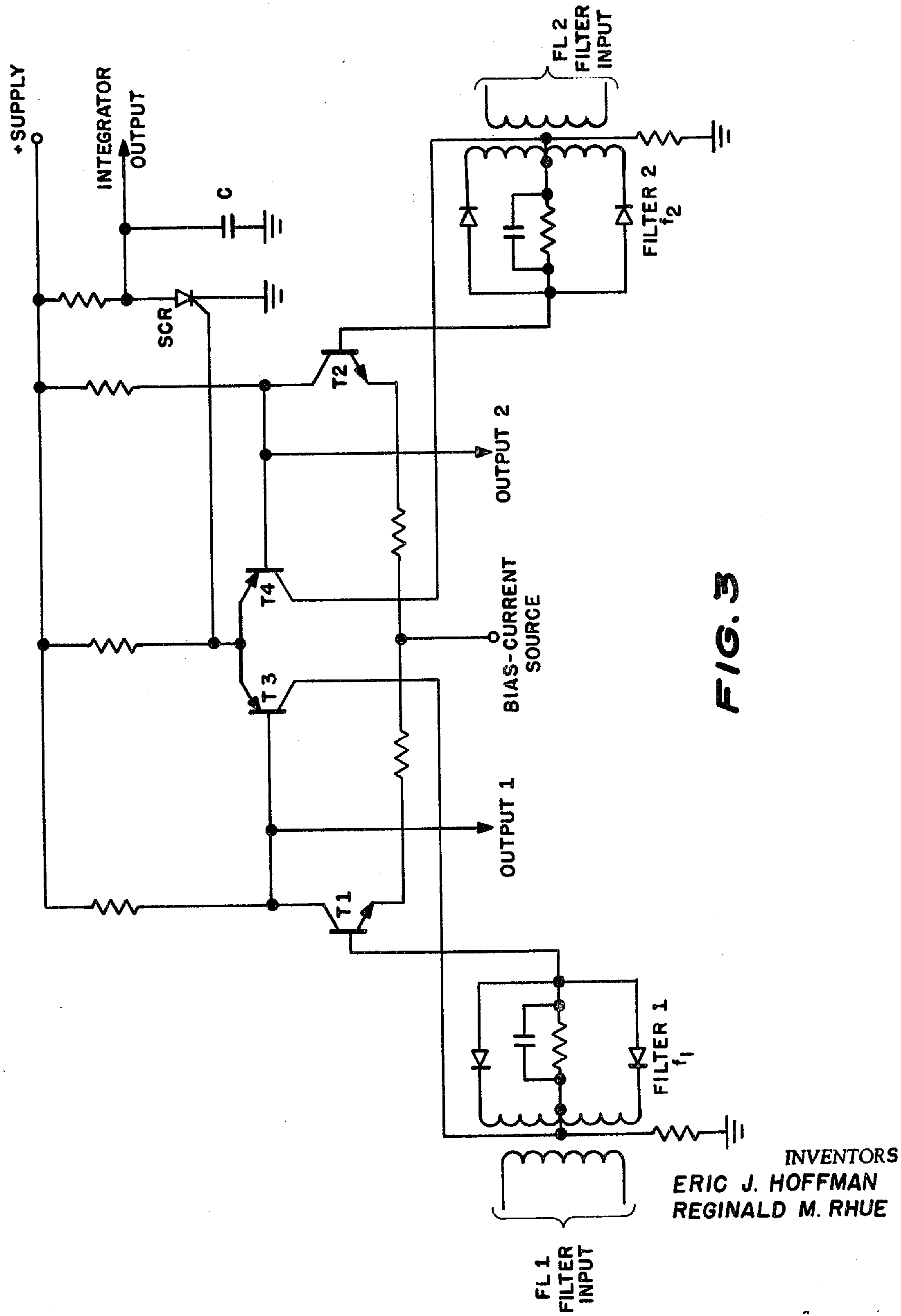
FIG. 3 is a circuit schematic of the tone decoder of the present invention.

Referring now to FIG. 3, there is shown a schematic diagram of the tone decoder of the present invention. Referring first to the no-input condition, transistors $T_1$ and $T_2$, analogous to a differential amplifier, are conductive. Transistors $T_3$ and $T_4$ are therefore nonconductive since they are reverse biased by conducting transistors $T_1$ and $T_2$, respectively. The silicon controlled rectifier (SCR) is conductive since transistors $T_3$ and $T_4$ do not draw any of its biasing current and, therefore the capacitor C remains uncharged.

Assuming, now, that a pulse passes through filter, 1, the base of $T_1$ becomes negatively biased, putting $T_1$ in its nonconductive state. Transistor $T_1$, being nonconductive, causes a voltage rise at the collector of $T_1$ and a voltage drop at the collector of $T_2$, this voltage drop causing $T_4$ to become conductive. When $T_4$ begins conducting it diverts the current which biased the SCR "on"; and the SCR becomes nonconductive, thereby charging capacitor C. While transistor $T_4$ is conductive, it should be noted that a feedback loop to the base of $T_2$ is completed, making $T_2$ further conductive. This feedback action is analogous to a Schmitt trigger.

The integration stage comprises the capacitor C and the SCR, the charge on capacitor C increasing with the amount of time the SCR is biased "off."

When the input tone is removed, signifying the end of the tone, all transistors revert to their original states, causing the SCR to latch on. Thus, a voltage drop is produced at the anode of the SCR whose amplitude is indicative of the tone duration.

Since the subject tone decoder comprises far fewer components than does the tone decoder known to the prior art, it is obvious that the decoder herein disclosed is more reliable, lighter, less bulky, less costly, and consumes less power than the conventional decoder.

We claim:

1. In combination with a redundant command system including a pair of receivers and a linear amplifier, a tone decoder connected to the output of the linear amplifier and comprising:
  a pair of input filters connected to the linear amplifier,
  a differential amplifier connected to the filters and receiving tone signals form the filters,
  an integrator circuit means including a capacitor connected to said differential amplifier,
  said differential amplifier having a pair of outputs for indicating the presence of a binary zero or a binary one in the tone signals produced by the receivers or either of them and including,
    a first pair of transistors connected to the filters and having a common output connected to the integrator and
    a second pair of transistors connected to the filters and to the first pair of transistors for controlling said first pair of transistors, and
  control means connected in parallel with the capacitor of said integrating circuit means and to the common output of said first pair of transistors for controlling the integrator,
    the collector of one of the transistors of said first pair of transistors, the base of one of the transistors of said second pair of transistors and one of the filters being connected to define a feedback loop to effect the action of a Schmitt trigger when said transistor of said first pair of transistors in conducting.

2. The tone decoder specified in claim 1 wherein said integrator control means comprises a silicon-controlled rectifier.

3. A tone decoder for a spacecraft command system wherein spacecraft commands are in the form of tone signals of either of two frequencies, said tone decoder comprising:
  a pair of input filters each of which is assigned to receive and filter a different one of said tone signals,
  a supply voltage source,
  a biasing current source,
  a pair of first transistors each having base, emitter and collector elements,
  the base of each of said transistors being connected to a different one of said input filters,
  the emitter of each of said transistors being connected to said biasing current source, and
  the collector of each of said transistors being connected to said supply voltage source, and
  a pair of second transistors each having base, emitter and collector elements,
  the base of each of said second transistors being connected to the collector of a different one of said first transistors,
  the emitters of said second transistors being connected together and to said supply voltage source, and
  the collector of each of said second transistors being connected by one of said input filters in a regenerative feedback loop to the base of the associated first transistor whose collector is connected to the base of that same second transistor.

4. The decoder specified in claim 3 wherein said regenerative feedback is provided by a resistor, one side of which is connected directly to the collector of said second transistor through said one filter to the base of said associated first transistor and the other side of which is connected to ground.

5. The tone decoder as specified in claim 3 and further including,
  integrator circuit means, and
  control means connected to said integrator means and responsive to the conduction state of said second pair of transistors for selectively permitting integrator circuit means to produce an output signal when a tone signal is being received by either of said input filters and for preventing said integrator circuit means from producing said output signal when neither of said output filters is receiving a tone signal.

6. The tone decoder as specified in claim 5 wherein:
  said integrator circuit means includes a capacitor connected between said supply voltage source and ground, and
  said control means is a silicon controlled rectifier having anode, cathode and gate element,
    said anode and cathode elements being connected across said capacitor, and
    said gate element being connected to the common emitter connection of said second transistors.